United States Patent [19]

Okada et al.

[11] Patent Number: 4,466,635
[45] Date of Patent: Aug. 21, 1984

[54] VEHICLE SUSPENSION MECHANISM

[75] Inventors: Tadashi Okada, Kanagawa; Yuji Furukawa, Tachikawa; Makoto Murata, Tokyo, all of Japan

[73] Assignee: Nissan Motor Company, Limited, Yokohama, Japan

[21] Appl. No.: 469,416

[22] Filed: Feb. 24, 1983

[30] Foreign Application Priority Data

Mar. 31, 1982 [JP] Japan ................................. 57-52721

[51] Int. Cl.³ ........................................... B62D 17/00
[52] U.S. Cl. .................. 280/661; 267/11 R; 267/57; 280/690; 403/3
[58] Field of Search ................. 280/661, 96.1, 660, 280/673, 675, 688, 689, 696, 149, 663, 666, 690; 301/133, 136; 267/57, 11 R; 188/196; 403/3, 4

[56] References Cited

U.S. PATENT DOCUMENTS

| 3,883,152 | 5/1975 | de Carbon | 280/675 X |
| 4,157,840 | 6/1979 | Kroniger et al. | 280/688 |
| 4,194,760 | 3/1980 | Shiomi et al. | 280/661 |
| 4,243,339 | 1/1981 | Dickerson | 280/661 X |

FOREIGN PATENT DOCUMENTS 47-24015 10/1972 Japan .

Primary Examiner—Joseph F. Peters, Jr.
Assistant Examiner—Mitchell J. Hill
Attorney, Agent, or Firm—Lane, Aitken & Kananen

[57] ABSTRACT

A suspension mechanism for a wheeled vehicle, comprising a suspension arm having a pair of arm portions aligned with each other in a lateral direction of the vehicle body and pivotally connected to the vehicle body for being rockable about a first axis fixed with respect to the vehicle body and transverse to the vehicle body; a wheel axle which is pivotally connected to the suspension arm and rockable about a second axis fixed with respect to the suspension arm and perpendicular to the first axis and which has a spindle portion having a center axis about which a wheel-and-tire assembly is rotatable; and angle adjusting means engaging the suspension arm and the wheel axle and adapted to permit adjustment of the angular position of the wheel axle with respect to the suspension arm about the second axis.

2 Claims, 5 Drawing Figures

VEHICLE SUSPENSION MECHANISM

FIELD OF THE INVENTION

The present invention relates to a suspension mechanism of a wheeled vehicle such as an automotive vehicle and, more particularly, to a vehicle suspension mechanism adapted to control the roll steer resulting from the rolling of the vehicle body.

BACKGROUND OF THE INVENTION

A vehicle suspension mechanism adapted to control roll steer is disclosed in, for example, Japanese Provisional Patent Publication No. 47-24015. The suspension mechanism herein disclosed comprises a suspension arm pivotally connected to the vehicle body by means of two eccentric bolts. The suspension arm is thus rockable with respect to the vehicle body about an axis which is adjustable by turning one or both of the eccentric bolts. The toe and camber angles of the road wheel can be adjusted by varying the angular position of the suspension arm about the axis of rocking motion thereof. A drawback is encountered in a prior-art suspension mechanism of this nature in that, when the axis of rocking motion of the suspension arm is adjusted as above noted, the suspension arm is caused to tilt laterally of the vehicle body and as a consequence the toe angle of the road wheel fails to become zero degrees when the angle of roll of the vehicle body is at zero degrees and vice versa. (This is graphically indicated by curve a in FIG. 5 of the drawings.) It is for this reason impossible to have the roll steer characteristics of the vehicle body varied depending upon the performance of the tires and other parameters affecting the performance characteristics of the suspension system with one of the toe angle and the angle of body roll maintained at zero degrees when the other thereof becomes zero degrees.

It is, accordingly, an important object of the present invention to provide an improved vehicle suspension mechanism capable of varying the roll steer characteristics of the vehicle body depending upon the performance of the tires and other parameters affecting the performance characteristics of the suspension system with one of the toe angle and the angle of body roll maintained at zero degrees when the other thereof becomes zero degrees.

It is another important object of the present invention to provide an improved vehicle suspension mechanism featuring, particularly, a suspension arm which is arranged in such a manner as to be rockable about an axis fixed with respect to the vehicle body and which nevertheless permits adjustment of the axis of rotation of a road wheel with respect of the axis of rocking motion of the suspension arm.

SUMMARY OF THE INVENTION

In accordance with the present invention, there is provided a suspension mechanism for a wheeled vehicle including a wheel-and-tire assembly and a vehicle body, comprising a suspension arm having a pair of arm portions aligned with each other in a lateral direction of the vehicle body and pivotally connected to the vehicle body for being rockable about a first axis fixed with respect to the vehicle body and transverse to the vehicle body; a wheel axle which is pivotally connected to the suspension arm and rockable about a second axis fixed with respect to the suspension arm and substantially perpendicular to the first axis and which has a spindle portion having a center axis about which the wheel-and-tire assembly is rotatable; and angle adjusting means engaging the suspension arm and the wheel axle and adapted to permit adjustment of the angular position of the wheel axle with respect to the suspension arm about the second axis. The above mentioned angle adjusting means may comprise an arm portion forming part of the wheel axle and extending opposite to the spindle portion in a lateral direction of the vehicle body, a plurality of spacer elements superposed on one another between the suspension arm and the arm portion of the wheel axle, and fastening elements fastening together the suspension arm, the arm portion and the spacer elements.

BRIEF DESCRIPTION OF THE DRAWINGS

The features and advantages of a suspension mechanism according to the present invention will be more clearly appreciated from the following description taken in conjunction with the accompanying drawings in which.

DESCRIPTION OF THE PREFERRED EMBODIMENTS

Figure 1:
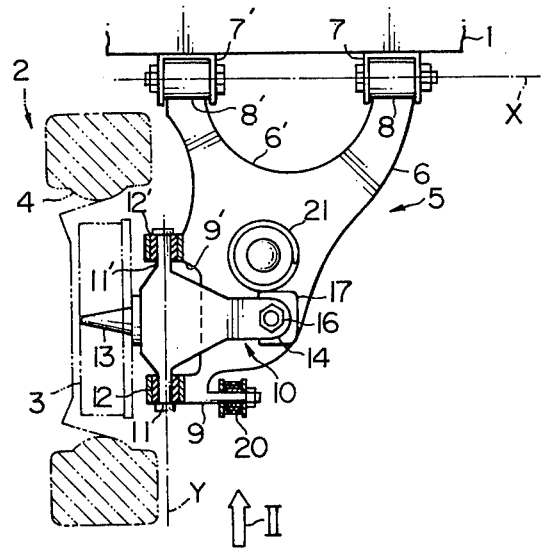
FIG. 1 is a plan view showing, partially in section, a preferred embodiment of a suspension mechanism according to the present invention.
Figure 2:
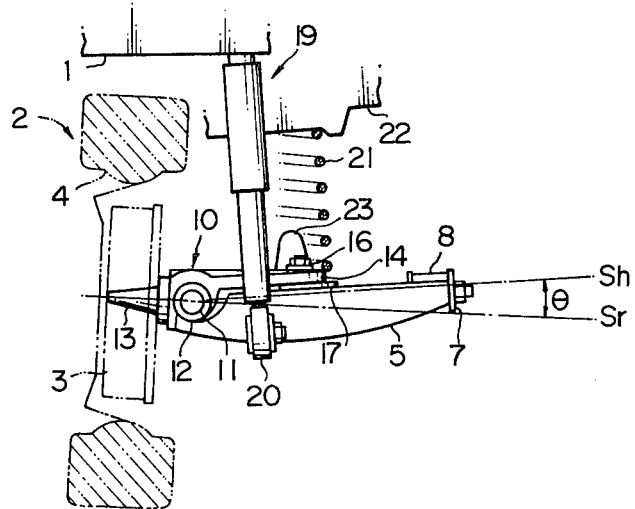
FIG. 2 is a view showing the suspension mechanism as viewed in a direction indicated by arrow II in FIG. 1.

Referring to FIGS. 1 and 2 of the drawings, an independent suspension mechanism embodying the present invention is shown arranged in association with an automotive vehicle body 1 and a wheel-and-tire assembly 2 including a road wheel structure 3 and a tire 4. the suspension mechanism comprises a bifurcated suspension arm 5 having a pair of arm portions 6 and 6' spaced apart from each other laterally of the vehicle body and connected to the vehicle body 1 or to any lateral member such as a lateral suspension member (not shown) secured to the vehicle body 1 by suitable elastic pivot means. In the embodiment herein shown, such pivot means are shown comprising rigid bracket members 7 and 7' securely attached to the vehicle body 1 or the above mentioned suspension member and cylindrical rubber bushings 8 and 8' which are circumferentially slidable in the arm portions 6 and 6', respectively, and which are fitted to the bracket members 7 and 7', respectively, by bolts and nuts as shown. The bushings 8 and 8' have respective center axes aligned with each other in a lateral direction of the vehicle body so that the suspension arm 5 as a whole is rockable about an axis X passing through the respective center axes of the rubber bushings 8 and 8' and accordingly transverse to the vehicle body. The suspension arm 5 further has a pair of lug portions 9 and 9' spaced apart from each other in a fore-and-aft direction of the vehicle body and located adjacent to the road wheel structure 3 as shown in FIG. 1. Each of the lug portions 9 and 9' is formed with a cylindrical bore. While the suspension arm 5 in the shown embodiment is assumed to be of the full trailing type, the same may be replaced with a suspension arm of the semi-trailing type.

Figure 3:
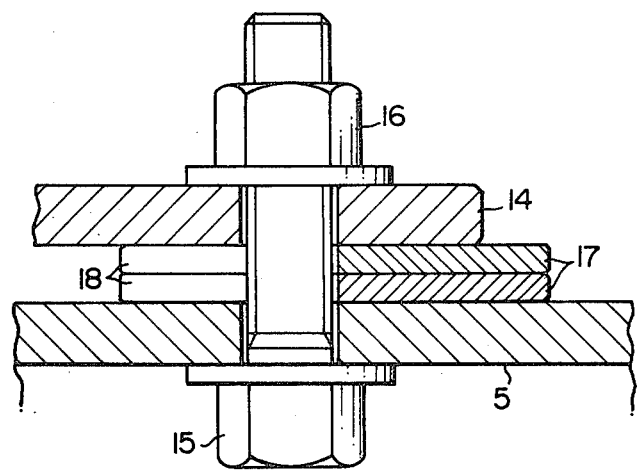
FIG. 3 is a vertical sectional view showing, to an enlarged scale, angle adjusting means included in the suspension mechanism shown in FIGS. 1 and 2.
Figure 4:
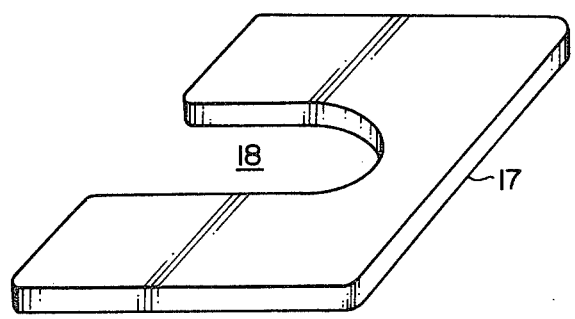
FIG. 4 is a perspective view showing one of the spacer elements forming part of the angle adjusting means shown in FIG. 3.

The suspension mechanism embodying the present invention further comprises a wheel axle 10 having a pair of pivot portions 11 and 11' axially projecting in opposite directions and aligned with each other in a fore-and-aft direction of the vehicle body. The pivot portions 11 and 11' of the wheel axle 10 are received in rubber bushings 12 and 12', respectively, which in turn are received in the cylindrical bores in the above mentioned lug portions 9 and 9', respectively. The bushings 12 and 12' have respective center axes aligned with each other in a fore-and-aft direction of the vehicle body so that the wheel axle 10 is rockable about an axis Y passing through the respective center axes of the bushings 12 and 12' and accordingly perpendicular to the axis X of rocking motion of the suspension arm 5 with respect to the vehicle body. The wheel axle 10 is, thus, rockable not only longitudinally of the vehicle body about the above mentioned axis X together with the suspension arm 5 but laterally of the vehicle body about the axis Y with respect to the suspension arm 5. The wheel axle 10 further has a spindle portion 13 extending in a lateral direction of the vehicle body and received in bearings (not shown) in the wheel hub or drum of the road wheel structure 3 so that the wheel-and-tire assembly 2 is rotatable about the center axis of the spindle portion 13. The wheel axle 10 further has an arm portion 14 extending also laterally of the vehicle body but opposite to the above mentioned spindle portion 13. The arm portion 14 of the wheel axle 10 is secured to the suspension arm 5 by means of a bolt 15 (FIG. 3) and a nut 16 with a suitable number of spacer elements 17 superposed on one another between the arm portion 14 and the suspension arm 5 as shown to an enlarged scale in FIG. 3. The spacing between the suspension arm 5 and the arm portion 14 of the wheel axle 10 is thus adjustable by selecting the number and/or the respective thicknesses of the spacer elements 17. Accordingly, the angular position of the wheel axle 10 about the axis Y or, in other words, the angle $\theta$ between a generally horizontal plane Sh containing the axes X and Y and a plane Sr containing the axis Y and the axis of rotation of the wheel-and-tire assembly 2 as indicated in FIG. 2 is adjustable by selecting the number and/or the respective thicknesses of the two or more spacer elements 17. The camber angle of the wheel-and-tire assembly 2 can accordingly be adjusted by adjusting the angle $\theta$ between the planes Sh and Sr. Thus, the arm portion 14 of the wheel axle 10 and the spacer elements 17 constitute, in combination, angle adjusting means adapted to adjust the camber angle of the wheel-and-tire assembly 2 with respect to the vehicle body. The toe angle of the wheel-and-tire assembly 2 is maintained at zero degrees under static load conditions of the suspension mechanism since the axis X is fixed with respect to the vehicle body. Each of the spacer elements 17 is formed with a recess 18 as shown in FIG. 4, allowing the bolt 15 to axially pass therethrough.

The suspension mechanism embodying the present invention further comprises a fluid-operated shock absorber 19 joined at its upper end to the vehicle body 1 and at its lower end to the suspension arm 5. In FIGS. 1 and 2, the shock absorber 19 is shown coupled to the suspension arm 5 by means of a rubber bushing 20. As shown in FIG. 2, a helical compression spring 21 is seated at its upper end on a suitable spring seat member 22 secured to the vehicle body 1 and at its lower end on the suspension arm 5. The spring 21 may be positioned concentrically with respect to the shock absorber 19 or sidewise of the shock absorber 19. A bumper rubber 23 is fixedly mounted on the suspension arm 5 as shown in FIG. 2.

Figure 5:
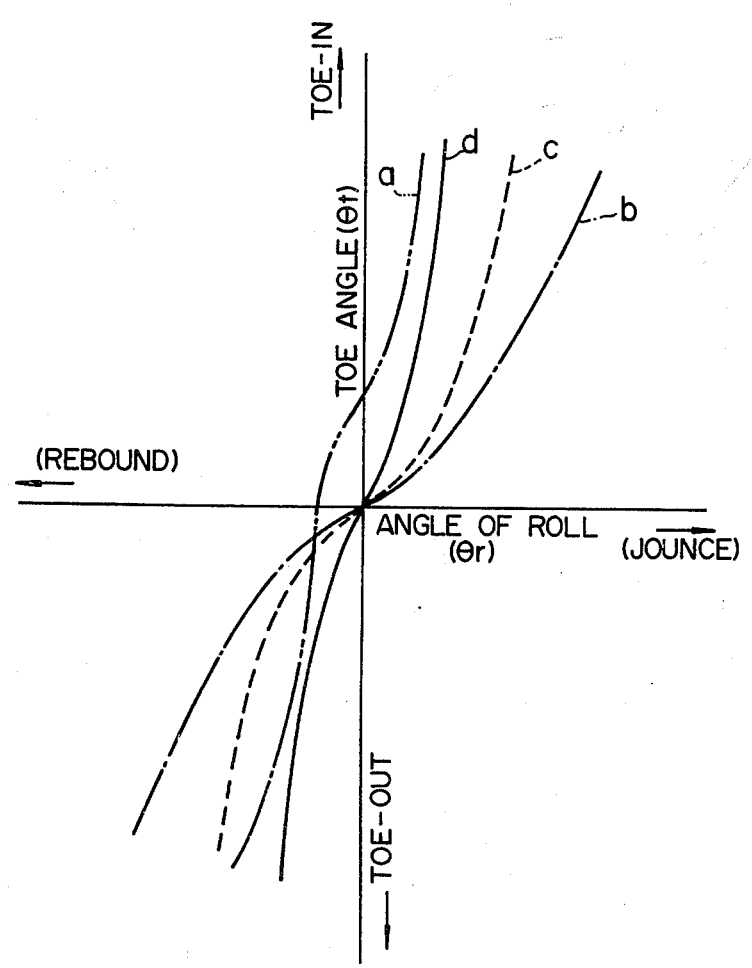
FIG. 5 is a graph showing the roll steer characeistics in terms of vehicle body roll angle of an automotive vehicle using a suspension mechanism embodying the present invention.

When, now, the vehicle body 1 is rolling about a fore-and-aft axis thereof, the suspension arm 5 is caused to jounce and rebound angularly about the axis X so that the toe angle of the wheel-and-tire assembly 2 varies with the camber angle of the wheel-and-tire assembly 2 as the angle of roll of the vehicle body varies. If, in this instance, the number and/or the respective thicknesses of the spacer elements 17 are increased to reduce the previously mentioned angle $\theta$ between the planes Sh and Sr (FIG. 2), the camber angle of the wheel-and-tire assembly 2 decreases and, as a consequence, the variation in the toe angle $\theta t$ of the assembly 2 with respect to the angle of roll $\theta r$ of the vehicle body decreases as indicated by curve b in FIG. 5. The decrease in the variation of the toe angle $\theta t$ of the wheel-and-tire assembly 2 with respect to the angle of roll $\theta r$ results in reduction in the roll steering tendency of the vehicle. If, on the contrary, the number and/or the respective thicknesses of the spacer elements 17 are decreased to increase the angle $\theta$ between the planes Sh and Sr (FIG. 2), the camber angle of the wheel-and-tire assembly 2 increases and as a consequence the variation in the toe angle $\theta t$ of the wheel-and-tire assembly 2 with respect to the angle of roll $\theta r$ of the vehicle body increases as the angle $\theta$ increases as indicated by curves c and d in FIG. 5. The increase in the variation of the toe angle $\theta t$ of the wheel-and-tire assembly 2 with respect to the angle of body roll $\theta r$ gives rise to an increase in the roll steering tendency of the vehicle as will be seen from curve d in FIG. 5. As will be further seen from curves b, c and d, the toe angle $\theta t$ becomes zero degrees without respect to the angle $\theta$ between the planes Sh and Sr when the angle of body roll $\theta r$ is maintained at zero degrees.

As will have been understood from the foregoing description, the vehicle suspension mechanism proposed by the present invention features, particularly, a suspension arm which is arranged in such a manner as to be rockable about an axis fixed with respect to the vehicle body and which nevertheless permits adjustment of the axis of rotation of a road wheel with respect of the axis of rocking motion of the suspension arm. A vehicle suspension mechanism according to the present invention is, thus, adapted to have the roll steer characteristics of the vehicle body varied depending upon the peformance of the tires and other parameters affecting the peformance characteristics of the suspension system with one of the toe angle and the angle of body roll maintained at zero degrees when the other thereof becomes zero degrees.

What is claimed is:

1. A suspension mechanism for a wheeled vehicle including a wheel-and-tire assembly and a vehicle body, comprising
a suspension arm having a pair of arm portions substantially aligned with each other in a lateral direction of the vehicle body and pivotally connected to the vehicle body for being rockable about a first axis fixed with respect to the vehicle body and transverse to the vehicle body;

a wheel axle, including an arm portion which is pivotally connected to said suspension arm, and which is rockable about a second axis fixed with respect to the suspension arm and substantially perpendicular to said first axis, and which has a spindle portion having a center axis about which said wheel-and-tire assembly is rotatable; and angle adjusting means engaging said suspension arm and said wheel axle and adapted to permit adjustment of the angular position of the wheel axle with respect to the suspension arm about said second axis, said angle adjusting means comprising a spacer element between said suspension arm and the arm portion of said wheel axle and fastening elements fastening together said suspension arm and said spacer element.

2. A suspension mechanism as set forth in claim 1, in which said wheel axle further has a pair of pivot portions axially projecting in opposite directions and substantially aligned with each other in a fore-and-aft direction of the vehicle body, the pivot portions being pivotally connected to said suspension arm so that the wheel axle is rockable about said second axis with respect to the vehicle body and to the suspension arm.

* * * * *